(12) United States Patent
Frank et al.

(10) Patent No.: US 7,970,947 B1
(45) Date of Patent: Jun. 28, 2011

(54) TACTICAL TARGETING NETWORK TECHNOLOGY SMALL FORM FACTOR USER SYSTEM

(75) Inventors: Robert J. Frank, Cedar Rapids, IA (US); Carlen R. Welty, Solon, IA (US); Scott J. Zogg, Cedar Rapids, IA (US); Carlos J. Chavez, Marion, IA (US); Bruce S. Kloster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1387 days.

(21) Appl. No.: 11/077,174

(22) Filed: Mar. 10, 2005

(51) Int. Cl.
*G06F 15/16* (2006.01)
(52) U.S. Cl. ........................................ 709/249
(58) Field of Classification Search .................. 709/249; 342/1; 455/424
See application file for complete search history.

(56) References Cited

U.S. PATENT DOCUMENTS

| | | | |
|---|---|---|---|
| 4,383,323 | A | 5/1983 | Timor |
| 4,688,251 | A | 8/1987 | Citron et al. |
| 5,422,952 | A | 6/1995 | Kennedy et al. |
| 5,625,641 | A | 4/1997 | Takakusaki |
| 5,715,236 | A | 2/1998 | Gilhousen et al. |
| 5,757,767 | A | 5/1998 | Zehavi |
| 5,781,582 | A | 7/1998 | Sage et al. |
| 5,832,026 | A | 11/1998 | Li |
| 5,914,933 | A | 6/1999 | Cimini et al. |
| 5,930,244 | A | 7/1999 | Ariyoshi et al. |
| 5,943,361 | A | 8/1999 | Gilhousen et al. |
| 6,049,535 | A | 4/2000 | Ozukturk et al. |
| 6,088,337 | A | 7/2000 | Eastmond et al. |
| 6,147,980 | A * | 11/2000 | Yee et al. ...................... 370/316 |
| 6,169,761 | B1 | 1/2001 | Marcoccia et al. |
| 6,246,698 | B1 | 6/2001 | Kumar |
| 6,320,896 | B1 | 11/2001 | Jovanovich et al. |
| 6,498,820 | B1 | 12/2002 | Thomson et al. |
| 6,507,739 | B1 * | 1/2003 | Gross et al. .................... 455/431 |
| 6,519,262 | B1 | 2/2003 | Stephens et al. |
| 6,522,650 | B1 | 2/2003 | Yonge et al. |
| 6,658,063 | B1 | 12/2003 | Mizoguchi et al. |
| 6,671,331 | B1 | 12/2003 | Sakuma |
| 6,686,829 | B1 | 2/2004 | Hohberger et al. |
| 6,721,331 | B1 | 4/2004 | Agrawal et al. |
| 6,836,469 | B1 | 12/2004 | Wu |
| 6,904,282 | B2 | 6/2005 | Cooper |
| 6,917,606 | B2 | 7/2005 | Sashihara |
| 7,088,734 | B2 | 8/2006 | Newberg et al. |
| 7,142,521 | B2 | 11/2006 | Haugli et al. |
| 7,183,967 | B1 * | 2/2007 | Haendel et al. ................. 342/59 |

(Continued)

OTHER PUBLICATIONS

Ernie Franke, Instantiation of the TADIL-A Waveform into a Software Programmable Tactical Intelligence Terminal, 1999, Raytheon Systems Company, pp. 1-5.*

(Continued)

*Primary Examiner* — Aaron Strange
*Assistant Examiner* — Esther Benoit
(74) *Attorney, Agent, or Firm* — Matthew J. Evans; Daniel M. Barbieri

(57) ABSTRACT

The present invention is directed to a small size and light weight small form factor user system suitable for having TTNT connectivity which consumes minimum power to operate. The small form factor user system having TTNT connectivity may be capable of interacting in a low latency real time manner with airborne networks. The small form factor user system having TTNT connectivity may have significantly reduced radio power consumption and form factor size through maintaining core capabilities of the full size TTNT terminal while relaxing other capabilities. An encapsulated message structure may be utilized to simplify communication between the TTNT small form factor user system and the full size TTNT nodes.

10 Claims, 4 Drawing Sheets

U.S. PATENT DOCUMENTS

| | | |
|---|---|---|
| 7,292,617 B2 | 11/2007 | Beasley et al. |
| 2002/0009067 A1 | 1/2002 | Sachs et al. |
| 2003/0012217 A1 | 1/2003 | Andersson et al. |
| 2003/0053469 A1 | 3/2003 | Wentink |
| 2004/0203460 A1 | 10/2004 | Hasegawa |
| 2005/0013386 A1 | 1/2005 | Ojard |
| 2005/0030914 A1 | 2/2005 | Binzel et al. |
| 2005/0113068 A1* | 5/2005 | Hoffmann ............... 455/411 |
| 2005/0242990 A1 | 11/2005 | Lawrence et al. |
| 2005/0254560 A1 | 11/2005 | Huang |
| 2006/0018391 A1 | 1/2006 | Cho et al. |

OTHER PUBLICATIONS

Jason Melby, JTRS and the Evolution Toward Software-Defined Radio, 2002, SAIC, pp. 1286-1290.*

Lisa A. Buckman et al., Demonstration of a Small-Form-Factor WWDM Transceiver Module for 10-Gb/s Local Area Networks, 2002, IEEE Photonics Technology Letters, vol. 14 No. 5, May 2002.*

B.E. White, Tactical Data Links, Air Traffic Management, and Software Programmable Radios, 1999, IEEE and the MITRE Corporation, pp. 1-9.*

* cited by examiner

TACTICAL TARGETING NETWORK TECHNOLOGY SMALL FORM FACTOR USER SYSTEM

FIELD OF THE INVENTION

The present invention generally relates to the field of computer network communications, and particularly to a small form factor user system having tactical targeting network technology connectivity.

BACKGROUND OF THE INVENTION

Various high bandwidth networks are utilized to transform military services into a strategically responsive force dominant in all types of military operations. Network centric operations may decrease the need to move as many people to the field, with more operations carried out remotely. Many wireless data networks are designed to provide airborne units (pilots) more crucial awareness of their targets and hostile surroundings.

However, a ground based wireless network structure has bandwidth and connectivity problems. For example, a communication bottleneck is present when a user in a ground wireless network desires to connect the secured communication network with high bandwidth global network such as the Global Information Grid (GIG). This communication bottleneck cannot be prevented by increasing data bandwidth in conventional ground wireless networks alone. Current data link options providing connectivity between ground wireless networks and the GIG have limitations in information rate and latency.

Prior art currently associates The Tactical Targeting Network Technology (TTNT) with airborne tactical networks which require time critical cooperative engagements and information fusion applications. Thus, the TTNT is designed to provide a low latency, Anti-Jam (AJ) tactical networked waveform, with a wideband, software re-configurable radio architecture. A ground user may desire to utilize various functionalities of TTNT airborne networks to overcome prior art bandwidth and connectivity problems of the ground wireless networks with the TTNT and GIG. However, in many cases, special routing platforms are necessary to translate data from ground to airborne networks. For example, the translation from Enhanced Position Locating Reporting System (EPLRS) to tactical data links such as Link-16 requires a prior art routing platform which maintains a bottleneck effect slowing message transmission and lessening the tactical value. Moreover, most ground user devices and applications may be frequently mounted, dismounted, or moved. Consequently, most ground user devices and applications have restrictions in terms of size, weight and power consumption. Thus, a typical full size TTNT terminal may not be practical for ground users since it will make ground user devices too heavy and bulky when it is so equipped. Moreover, a typical full size TTNT terminal may consume a considerable amount of power, resulting in the increased complexity in hardware.

Therefore, it would be desirable to provide a small form factor user system which can avoid the communication bottleneck problems and achieve full global information grid (GIG) connectivity. It would be also desirable to provide a small form factor user system which is compact in size, light weight and operates with minimum power consumption. A small form factor user system has applications beyond ground based networks. These applications include extending connectivity to smart bombs, missiles, small unmanned aerial vehicles, and other users particularly concerned with size, weight, and power.

SUMMARY OF THE INVENTION

Accordingly, the present invention provides a small size and light weight TTNT small form factor user system having TTNT and GIG connectivity which consumes minimum power to operate. The TINT small form factor user system may be capable of directly interacting in a low latency real time manner with TTNT airborne networks. The TTNT small form factor user system units may have significantly reduced power consumption and size while maintaining core capabilities of the full size TTNT terminal.

In a first aspect of the present invention, a TTNT small form factor user system comprises at least one transceiver unit for allowing transmitting and receiving signals. The transceiver unit comprises a power amplifier, a receiving functional unit, and transmitting functional unit. The transceiver unit may be capable of tuning to various data channels, including tunable TTNT frequencies. The TTNT small form factor user system also includes a processor for providing interface and networking functionalities. Preferably, the processor may support both Ethernet interface and USB interface. The TTNT small form factor user system may have limited complexity so as to reduce power consumption and the size of the system.

In a second aspect of the present invention, a method for a small form factor system having TTNT connectivity is provided. A TTNT small form factor user message may be utilized to allow multiple simultaneous data stream reception by many TTNT network nodes and a designated small form factor system destination. The TTNT small form factor user message may include a TTNT packet and a header. The TTNT packet is an original data packet transmitted or received to/from TTNT network nodes. The header may be an additional preamble containing core information of the TTNT message. Thus, the signals destined to the small form factor system may be encapsulated in the additional preamble. Such a message structure may allow the TINT network nodes to acquire and demodulate messages destined for the small form factor system by ignoring the additional encapsulation preamble.

In an advantageous aspect of the present invention, the TINT small form factor user system may significantly reduce radio power consumption and form factor size compared to the full size TTNT terminal. This may be done through maintaining core capabilities of the full size TTNT terminal while reducing some capability which may not be noticeable to the small form factor user. As such, the small form factor user system may be small size and light weight so as to be utilized by various small form factor user devices, vehicles, hand-held units and the like. It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
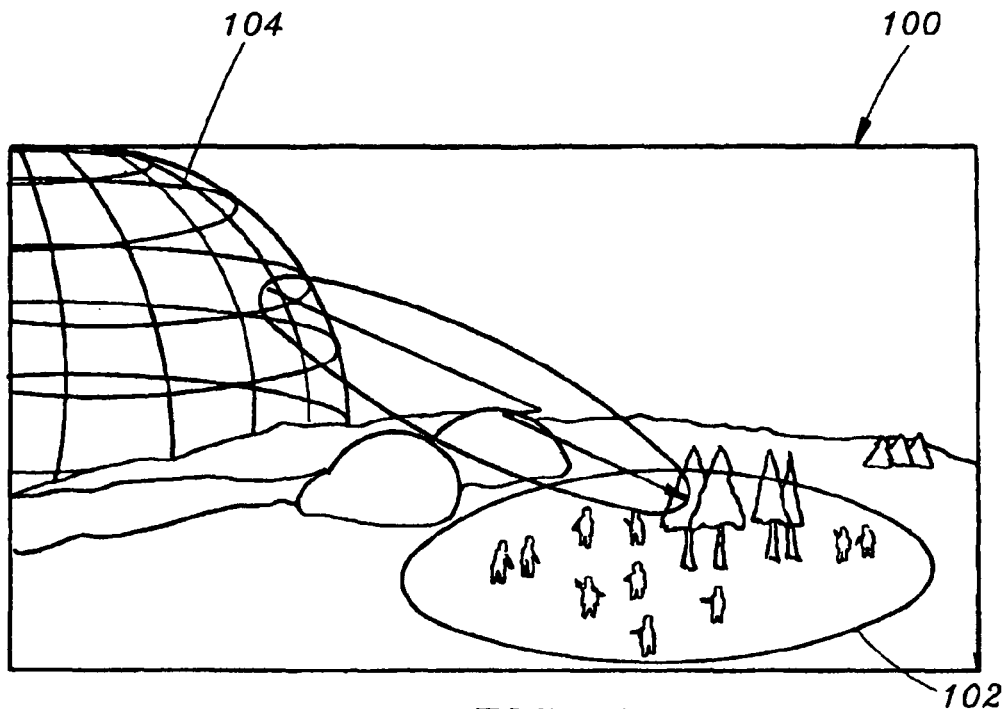
FIG. 1 is an illustration of an exemplary environment of a ground network without having TTNT connectivity where the ground network communicates to GIG.

Reference will now be made in detail to the presently preferred embodiments of the invention, examples of which are illustrated in the accompanying drawings.

The present invention is directed to a compact size and light weight small form factor user system which is suitable for directly interacting in a low latency real time manner with TTNT airborne networks. The TTNT small form factor user system may provide TTNT connectivity and significantly reduced radio power consumption and form factor size through maintaining core capabilities of the full size TTNT node while reducing some capabilities of the full size TTNT node. An encapsulated message packet structure may be utilized to simplify communication between the TTNT small form factor user system and the full size TTNT nodes.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring generally now to FIGS. 1 through 5, exemplary embodiments of the present invention are shown.

In an embodiment of the present invention, a TTNT small form factor user system may be suitable for use by ground users who desire to connect to TTNT airborne networks. Typically, ground user nodes have size and power disadvantages compared to TTNT airborne nodes. For example, most ground user devices and applications may be frequently mounted, dismounted, or moved and thus ground user devices and applications usually have restrictions in terms of size, weight and power consumption. A typical full size TTNT terminal may not be practical for ground users since it will make ground user devices too heavy and bulky when it is so equipped. Moreover, a typical full size TTNT terminal may consume a considerable amount of power, resulting in the increased complexity in hardware.

The Tactical Targeting Network Technology (TTNT) is an advanced low latency and Anti-Jam (AJ) tactical networked waveform with wideband software re-configurable radio architecture. Originally, the TTNT was developed to build airborne tactical networks which require time critical cooperative engagements and information fusion applications. In an embodiment of the present invention, the TTNT small form factor user system may provide the similar benefits of TTNT airborne nodes to the ground user. Moreover, the TTNT small form factor user system may provide a means to achieve full global information grid (GIG) connectivity via TTNT airborne networks.

It will be appreciated by those of skill in the art that the core requirements of TTNT airborne networks may define very aggressive, end-to-end latency bounds, in concert with simultaneous multi-user ad hoc network connectivity. For example, the TTNT airborne network may provide a capacity of over 200 line-of-sight nodes and over 1000 total nodes. The TTNT airborne network may also provide automatic topology discovery and routing, 5 second system ingress, and allow for autonomous operation without central control, while providing central monitoring and control capability when desired. The TTNT also operates with less than 2 milliseconds of latency at 100 nautical miles communications range and with less than 20 milliseconds of latency at 300 nautical miles. At these ranges, the TTNT supplies 2 Mbps and 250 Kbps respectively. The TTNT is designed to not disturb or perturb existing datalink communications. Thus, in the TTNT airborne network, the datalink provides TTNT communications connectivity while simultaneously providing full Anti-Jam (AJ) capability and operating in an ad-hoc manner (i.e. no network preplanning required).

In the TTNT networks, ad hoc channel access and low latency operation are enabled by a unique radio architecture that includes the use of special message structures and Statistical Priority-based Multiple Access (SPMA) traffic management method. The architecture and message structures allow multiple simultaneous data stream reception while SPMA allows the transmitters to self-manage and self-limit traffic offered depending upon the channel congestion level detected at each node. Hence, a transmitter initiates communications at any point in time. In other words, there is no need to wait for a Time Division Multiple Access (TDMA) epoch or the like.

Referring now to FIG. 1, an exemplary environment 100 of a ground network without having TTNT connectivity is shown. The ground network 102 such as a wireless ground network, a wireless and wired ground network, or the like, may be created to have significant data bandwidth. However, when a ground user desires to communicate with the existing secured communication network 104 such as the GIG, the ground user can not avoid bottleneck problems between the GIG and the ground network. Conventional data link options used by the ground network for providing connectivity to the global information grid 104 have limitations in either information rate, latency, or both. Even if the ground user desires to utilize TTNT airborne networks, the ground networks 102 are not suitable for directly interacting in a low latency real time manner with airborne networks. Typically, special routing platforms are necessary to translate from ground to TTNT airborne networks and the associated necessary extension nodes are required.

Figure 2:
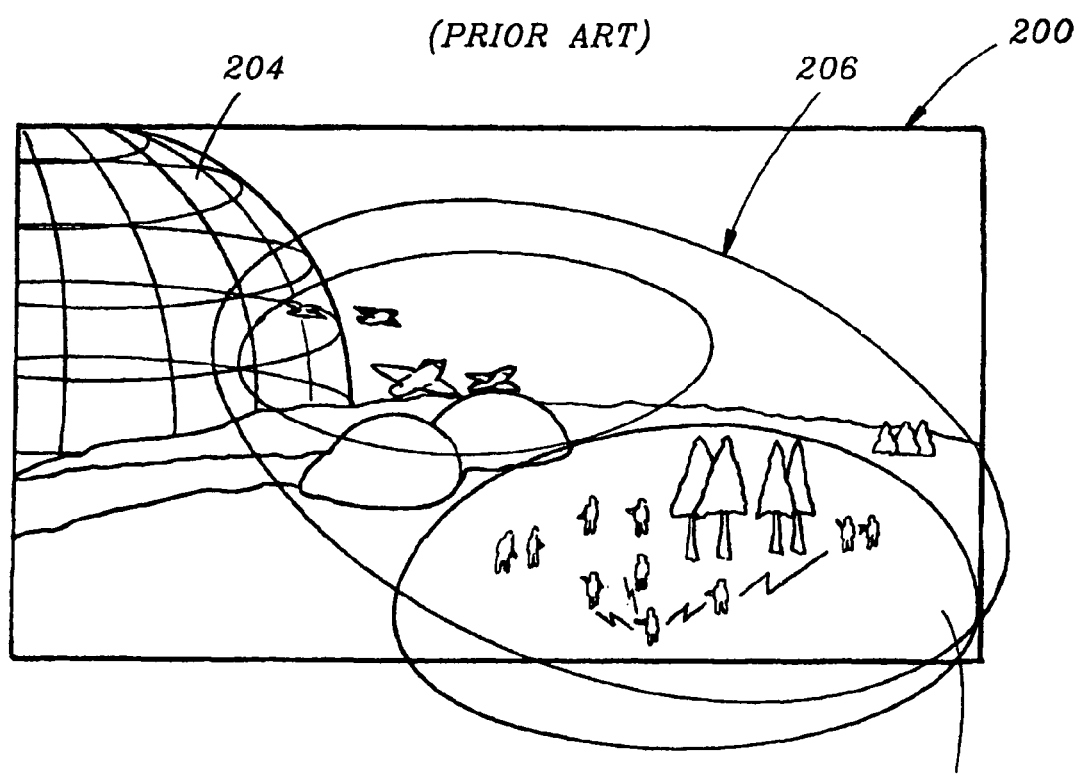
FIG. 2 is an illustration of an exemplary environment of a ground network including TTNT small form factor user systems in accordance with the present invention.

Referring now to FIG. 2, an exemplary environment 200 of a ground network having TTNT connectivity is shown. The ground network 202 such as a wireless ground network, a wireless and wired ground network, or the like may be created to have significant data bandwidth. A ground user within the ground network 202 may desire to communicate with the GIG without having any bottleneck problem. In the exemplary environment, a TTNT airborne network 206 may be able to provide routing to the GIG 204. TTNT small form factor user systems may be utilized by the ground users to achieve GIG interconnectivity via the TTNT airborne network. The TTNT small form factor user systems may be pulled directly into the TTNT airborne network 206, and may be provided with a robust low latency, high bandwidth, and high Doppler tolerant connection directly to tactical airborne platforms. Such direct tactical platform connectivity may allow highly dynamic information, fusion, targeting, and situational awareness operations to occur, in addition to supplying GIG connectivity.

Figure 3:
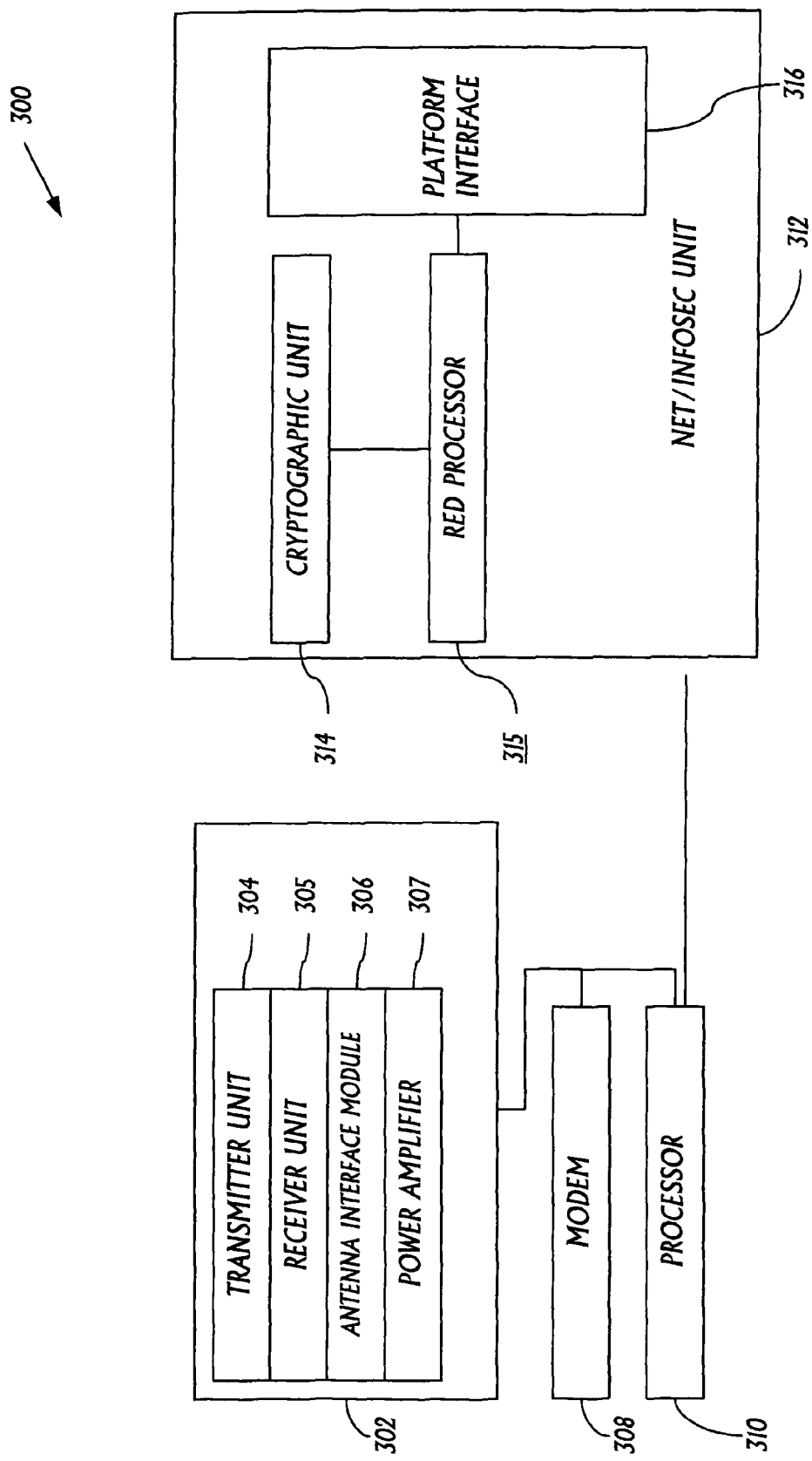
FIG. 3 is an illustration of a block diagram of an exemplary TTNT small form factor user system in accordance with the present invention.

Referring now to FIG. 3, a block diagram 300 representing an exemplary small form factor user system is shown. In this exemplary embodiment, the small form factor user system may comprise a transceiver 302, a modem 308, and a general processor (e.g. a black processor, or the like) 310. The transceiver 302 may provide either full or half duplex capabilities. The transceiver 302 may provide capabilities across the entire spectrum for which a full TTNT terminal is designed, or may be special purpose devices providing capabilities for only a portion of the spectrum. The general processor 310 coupled to the transceiver 302 may provide interface and networking functionalities. Preferably, the general processor 310 may support both Ethernet interface and USB interface. A modem 308 coupled to the transceiver 302 may modulate and demodulate signals (messages) for the user small form factor system.

The transceiver 302 may include a transmitter unit 304, a receiver unit 305, and a power amplifier 307, an antenna interface device 306, or the like. It is to be noted that the transceiver may be configured to comprise various components which are not shown in FIG. 3. In an embodiment of the present invention, the transceiver 302 may be a programmable transceiver. The programmable transceiver 302 may be a single channel transceiver dedicated to a single channel function. Alternatively, the programmable transceiver 302 may be reprogrammable for different primary RF functions. When an antenna (not shown) receives designated modulated RF signals, the modulated RF signals may be received by the receiver unit 305 through the antenna interface device 306. The small form factor user system comprises a modem 308 for digital signal processing. The received signals (e.g. data packets, signal-in-space messages, or the like) may be demodulated by a modem coupled to the transceiver 302. Similarly, the transmit unit 304 may transmit signals which have been modulated by the modem 308.

In one embodiment of the present invention, the TTNT small form factor user system may include a Networking and Information Security unit 312 consisting of a red processor 315 and a cryptographic unit 314. It will be appreciated that the black processor 310 may be a general processor for a Black domain and the red processor 315 may be a general processor for a Red domain. Conventionally, a secured network enforces a simple security policy of data confidentiality. In the secured network, users are not able to access sensitive information for which they are not authorized. In order to maintain such confidentiality, the network may be divided into a domain for processing possibly sensitive plain-text data, called the Red Domain, and a domain for processing non-sensitive and encrypted sensitive data, called the Black Domain. There may be multiple Red Domains in the network since each domain can be accredited to a different security (sensitivity) level. Users residing in the Red Domain are trusted to protect the information they process to a degree appropriate for the security classification of the data. Users residing in the Black Domain can access the Red Domain through a cryptographic unit.

In an embodiment of the present invention, the Networking and Information Security unit 312 may support multiple red applications. The cryptographic unit 314 may provide encryption/decryption for the red processor. In a further embodiment of the present invention, the Networking and Information Security unit 312 may include multiple cryptographic units and multiple red processors. It will be appreciated by those of skill in the art that multiple independent levels of security may be provided through the cryptographic units.

In one embodiment of the present invention, the transceiver 302 of the TINT small form factor user system may provide full receiving and transmitting compatibility with the transceiver of the full size TTNT terminal utilized in TTNT airborne network. The small form factor user system may be built around standard TTNT Space In Signal (SIS) transmission. Thus, small form factor user system targeted signals transmitted from TINT network nodes are encapsulated in additional preambles. The TTNT message encapsulation approach allows standard a TTNT terminal (e.g. a full TTNT terminal utilized in TTNT airborne network) to acquire and demodulate messages destined for the TTNT small form factor user systems by ignoring the additional encapsulation preamble. As such, the full TTNT terminals may be able to receive all messages destined for or sourced from the TTNT small form factor user systems.

Figure 4:
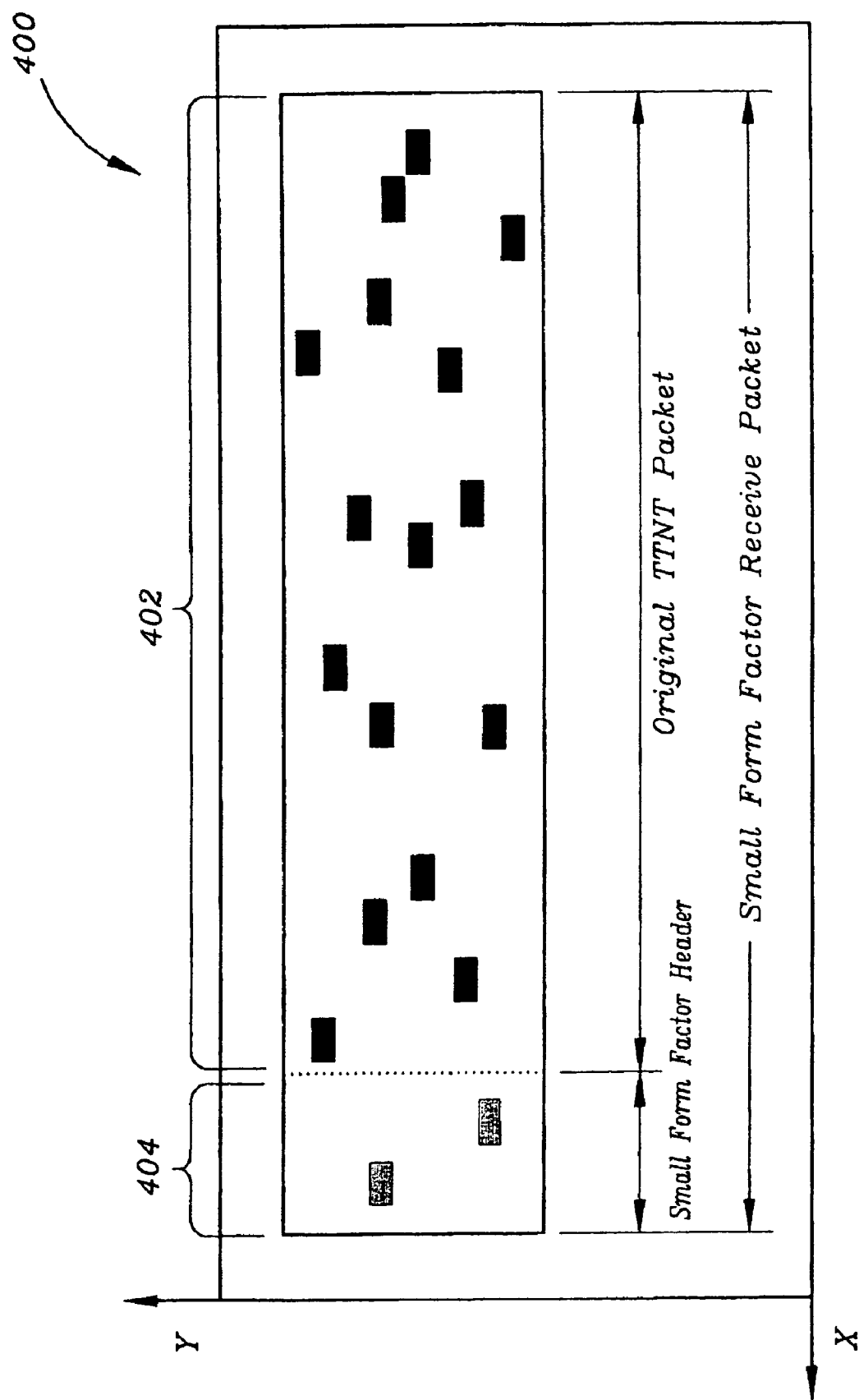
FIG. 4 is an illustration of an example message packet structure utilized by the TTNT small form factor user system in FIG. 3.

Referring now to FIG. 4, an exemplary message packet structure 400 for the waveform of the TTNT small form factor user system is shown. The message packet (data transmission packet) structure 400 in FIG. 4 is shown with time along the horizontal axis and frequency along the vertical axis. The blocks in area 402 represent an original TTNT frequency hopped transmission packet. The blocks in area 404 represent header dwells used to encapsulate a TTNT packet destined for the small form factor user system. The additional dwells (the header dwells) are composed of preamble bits that simplify the processing necessary for synchronization and acquisition within the TINT small form factor user system. In this manner, the transceiver unit and modem architectures of the TTNT small form factor user system may be simplified. The exemplary message packet structure 400 represents 2 frequency dwells in the additional preamble. It is to be appreciated that the header of the message packet structure may have various lengths, depending upon the chosen architecture. For example, a message packet structure with longer preamble headers may allow for more robust performance in the presence of interference, jamming, multi-path, and the like.

Figure 5:
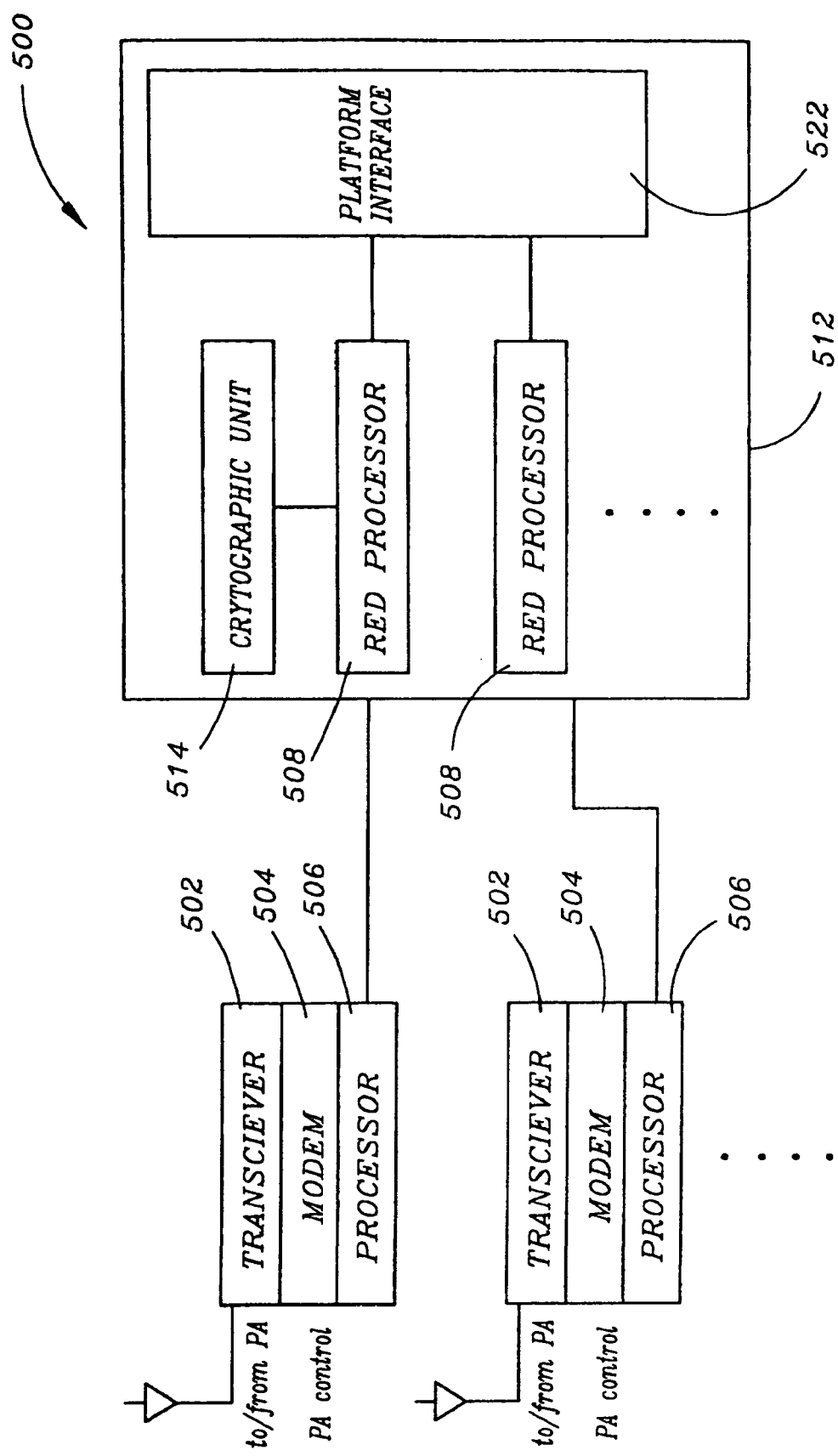
FIG. 5 is an illustration of a block diagram of a further exemplary TTNT small form factor user system in accordance with the present invention.

Referring now to FIG. 5, a block diagram 500 of a further exemplary small form factor user system is shown. The small form factor user system may comprise multiple transceivers 502. Each transceiver 502 may be coupled to a modem 504 and a black processor 506. As described above, the transceiver 502 may include various components depending on its specification. The transceiver 502 may be configured to provide either full or half duplex capabilities. The transceiver 302 may be programmable to provide capabilities across the entire band spectrum, or only a portion of the band spectrum. As described above, the transceiver 502 may include various components (not shown), such as a receiver/exciter, a power amplifier, a filter, or the like.

Each transceiver 502 may be coupled to a Networking and Information Security unit 512 consisting of multiple red processors 508, at least one cryptographic unit 514 and a platform interface 522. The Networking and Information Security unit 512 may supports red applications, INFOSEC functions, and platform interfaces for user channels. The red processors 508 may be dedicated to user communication channels. The red processors 508 may perform all red applications associated with the user communication channels as well as other applications permitted by the security policy for the TTNT small form factor user system. Additionally, the red processors 508 may support multiple independent levels of security, one given level on each individual red processor.

In an embodiment of the present invention, the TTNT small form factor user system may be programmed by a computer or a workstation via a wireless, hard-wired network or the like. Alternatively, hardware inserts, hardware cards, or software configuration devices can be utilized to configure the small form factor user system for various applications. The TINT small form factor user system is preferably configured before a mission. Additionally, the TTNT small form factor user system may have online reconfiguration capabilities to respond to changing mission conditions that arise from user inputs and signal requirements.

In a further embodiment of the present invention, the TTNT small form factor user system may be utilized on various platforms such as a vehicular platform, a backpack platform, or the like. Additionally, the TTNT small form factor user system can be utilized as the basis for a hand-held device for ground users. Furthermore, the TTNT small form factor user system can be used in numerous military and civilian applications, including smart bombs, missiles, small unmanned aerial vehicles, and other applications particularly concerned with size, weight, and power.

Advantageously, the TTNT small form factor user system may significantly reduce radio power consumption and form factor size. This may be done through maintaining core capabilities of a full size TTNT terminal (e.g. a TTNT airborne node) while relaxing some capabilities such as communications range, simultaneous reception, reception while transmitting, number of data rates, and the like. It will be appreciated that there are various levels of complexity which can be implemented in the TTNT small form factor user system while core TTNT capabilities are retained.

The TTNT small form factor user system may allow for loosening of a number of performance requirements that are tightly coupled to power consumption, resulting in a reduction in power consumption by many orders of magnitude when compared to a full size TTNT terminal. The reduced power consumption of the TTNT small form factor user system may allow many small form factor applications to utilize the TTNT small form factor user system.

Moreover, with the current drive toward network centric warfare and variety of sensor and information sources available to users, the TTNT small form factor user system may be extended to provide broad functionality. Thus, it is contemplated that the TINT small form factor user system may support various functionalities for time critical, streaming, periodic, and high integrity data. Depending on its application, the TTNT small form factor user system may support part or a combination of functionalities and capabilities of the full TTNT terminal such as Sensor Sharing; Situational Awareness; Enhanced/Distributed/Fused Targeting; Coordinated Targeting (Forward Observer Forward Air Control); Weapons Guidance; Tactical Command, Control and Coordination; Small Unmanned Airborne Vehicles Control and Connectivity; Anti-Jam Fast Deployment Tactical or Special Operations Automated Landing System Link; or the like.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the TTNT small form factor user system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A tactical targeting network technology (TTNT) small form factor (SFF) user system comprising:
   a first TTNT network, wherein the first TTNT network being a Global Information Grid;
   a second TTNT network, wherein the second TTNT network being an airborne network;
   at least one transceiver, for transmitting and receiving a plurality of SFF receive packets, wherein the plurality of SFF receive packets each being of signal in space (SIS) structure and each including a TTNT receive packet and a SFF header; the SFF header being an encapsulating preamble, wherein the encapsulating preamble promotes reduced processing for the TTNT SFF user system during acquisition and synchronization;
   at least one SFF receive packet of said plurality of SFF receive packets having been demodulated by a TTNT terminal of the airborne network and said encapsulating preamble is bypassed during demodulation; the airborne network being connected to the TTNT SFF user system, wherein the at least one SFF receive packet of the plurality of SFF receive packets having been demodulated, is transmitted via a node included in the first TTNT network, the first TTNT network being connected to the TTNT SFF user system via the airborne network;
   at least one modem;
   at least one processor; and
   at least one networking and information security unit.

2. The system of claim 1, wherein said TTNT receive packet comprises a time critical message.

3. The system of claim 1, wherein said modem modulates and demodulates said plurality of SFF receive packets.

4. The system of claim 1, wherein said processor processes an unsecured SFF receive packet of said plurality of SFF receive packets.

5. The system of claim 1, wherein said transceiver transmits and receives on a plurality of radio frequencies.

6. The system of claim 1, wherein said transceiver is connected to a power amplifier.

7. The system of claim 1, wherein said transceiver is locally and remotely programmable and reprogrammable.

8. The system of claim 1, further including a communications link between an airborne network and at least one TTNT SFF user system.

9. The system of claim 1, wherein said networking and information security unit provides:
- an interface function,
- a network function,
- at least one level of cryptographic function,
- at least one level of red processor, and
- a TTNT data link function.

10. A method, comprising:
- transmitting a SFF receive packet from a TTNT network node included in a first TTNT network to a TTNT terminal included in a second TTNT network, the first TTNT network being a Global Information Grid and the second TTNT network being an airborne TTNT network, the SFF receive packet being of signal in space (SIS) structure and including a TTNT receive packet and a SFF header, the SFF header being an encapsulating preamble which encapsulates a SFF targeted signal, and promotes reduced processing for the TTNT SFF user system during acquisition and synchronization;
- receiving the transmitted SFF receive packet at the TTNT terminal of the airborne TTNT network;
- demodulating the SFF receive packet at the TTNT terminal of the airborne TTNT network, wherein the encapsulating preamble is bypassed during said demodulating step;
- transmitting the demodulated SFF receive packet from the TTNT terminal of the airborne TTNT network to a TTNT SFF user system; and
- receiving the transmitted demodulated SFF receive packet at the TTNT SFF user system and processing said transmitted demodulated SFF receive packet.

* * * * *